United States Patent
Saracco et al.

(10) Patent No.: US 10,070,016 B2
(45) Date of Patent: Sep. 4, 2018

(54) MULTI-STRIPES LASERS FOR LASER BASED PROJECTOR DISPLAYS

(71) Applicant: Microvision, Inc., Redmond, WA (US)

(72) Inventors: Matthieu Saracco, Redmond, WA (US); Dale Eugene Zimmerman, Redmond, WA (US)

(73) Assignee: Microvision, Inc., Redmond, WA (US)

( * ) Notice: Subject to any disclaimer, the term of this patent is extended or adjusted under 35 U.S.C. 154(b) by 261 days.

(21) Appl. No.: 15/044,433

(22) Filed: Feb. 16, 2016

(65) Prior Publication Data

US 2017/0237880 A1    Aug. 17, 2017

(51) Int. Cl.

| | | |
|---|---|---|
| *G03G 21/14* | (2006.01) | |
| *H04N 9/31* | (2006.01) | |
| *H04N 3/28* | (2006.01) | |
| *G03B 21/20* | (2006.01) | |

(52) U.S. Cl.
CPC ........... *H04N 3/28* (2013.01); *G03B 21/2033* (2013.01); *H04N 9/3135* (2013.01); *H04N 9/3138* (2013.01); *H04N 9/3161* (2013.01)

(58) Field of Classification Search
CPC .. H04N 9/3138; H04N 9/3161; H04N 9/3164; H04N 9/3135; G02B 26/123; G02B 26/101; G03B 21/2033
See application file for complete search history.

(56) References Cited

U.S. PATENT DOCUMENTS

| | | | | |
|---|---|---|---|---|
| 7,993,005 | B2 * | 8/2011 | Peterson | G02B 26/105 353/30 |
| 9,100,590 | B2 * | 8/2015 | Raring | H04N 9/3129 |
| 9,690,181 | B2 * | 6/2017 | Graves | G03B 21/567 |
| 2010/0080253 | A1 | 4/2010 | Masood | |
| 2012/0280972 | A1 | 11/2012 | Champion et al. | |
| 2013/0222771 | A1 | 8/2013 | Tsubota et al. | |
| 2014/0293139 | A1 | 10/2014 | Raring et al. | |

FOREIGN PATENT DOCUMENTS

WO    WO2007050662    5/2007

OTHER PUBLICATIONS

Microvision, Inc., , "International Search Report and Written Opinion".

* cited by examiner

*Primary Examiner* — William C Dowling
(74) *Attorney, Agent, or Firm* — Kevin D. Wills

(57) ABSTRACT

A scanning projector and method is provided that that uses at least one multi-stripe laser to generate the laser light for the scanned image. Specifically, the multi-stripe laser includes at least a first laser element and a second laser element formed together on a semiconductor die. The first laser element is configured to output a first laser light beam, and the second laser element is configured to output a second laser light beam. At least one scanning mirror is configured to reflect the first laser light beam and the second laser light beam, and a drive circuit is configured to provide an excitation signal to excite motion of the at least one scanning mirror. Specifically, the motion is excited such that the at least one scanning mirror reflects the first laser light beam and the second laser light beam in a raster pattern of scan lines.

24 Claims, 12 Drawing Sheets

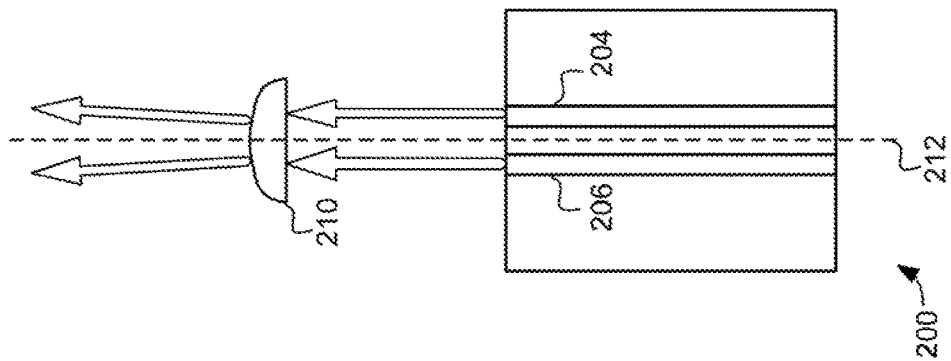
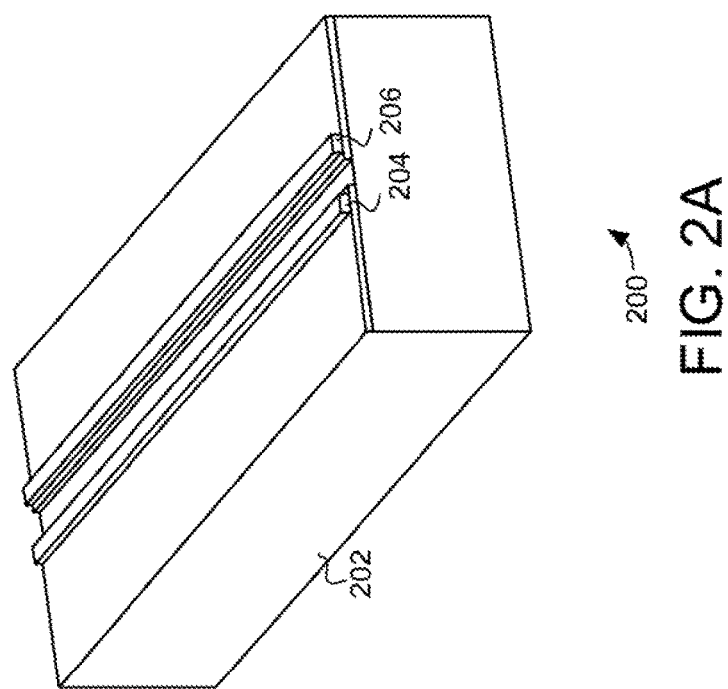

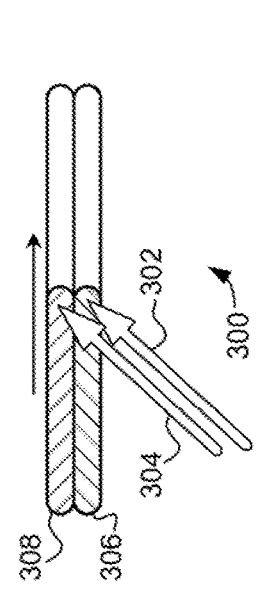
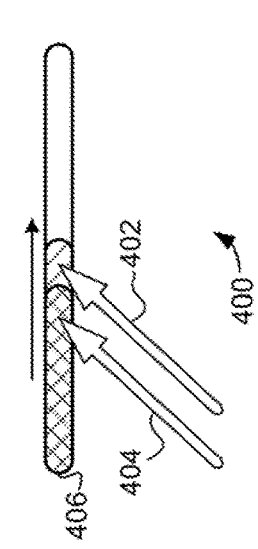
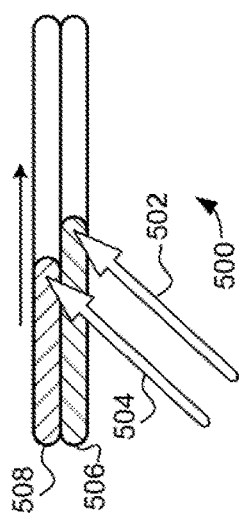
FIG. 3A  FIG. 4A  FIG. 5A
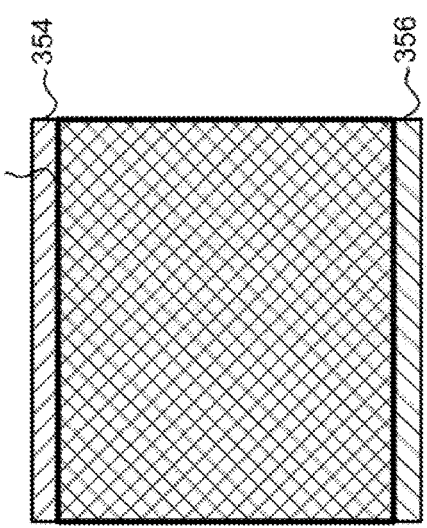
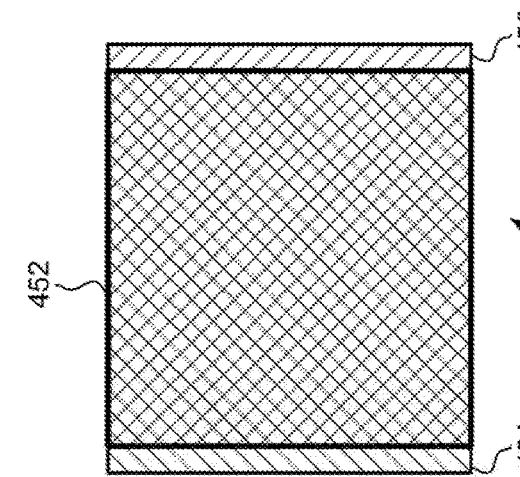
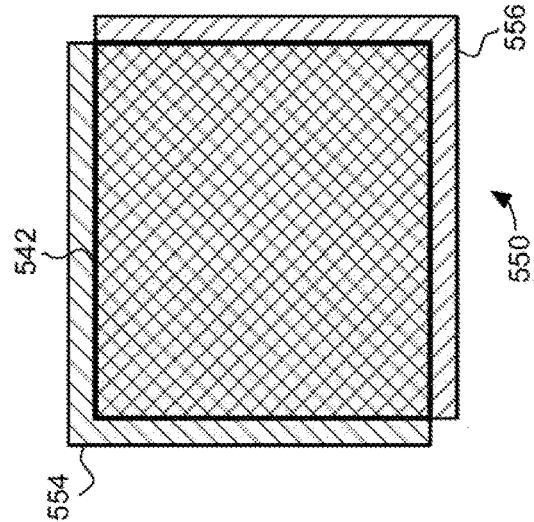
FIG. 3B  FIG. 4B  FIG. 5B

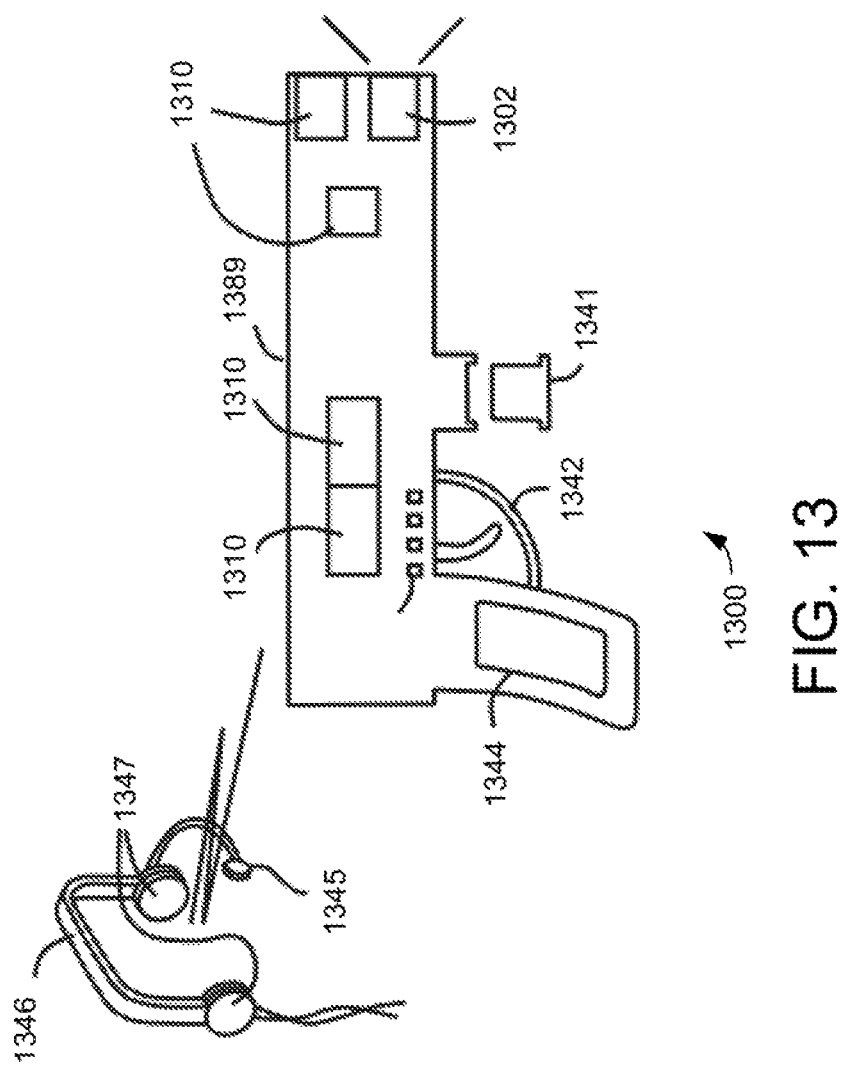

MULTI-STRIPES LASERS FOR LASER BASED PROJECTOR DISPLAYS

FIELD

The present disclosure generally relates to projectors, and more particularly relates to scanning projectors.

BACKGROUND

In scanning projectors, pixels are typically generated by modulating light from laser light sources as a scanning mirror scans the modulated light in a raster pattern. The brightness of an image generated by the scanning projector is limited by the maximum power available from the laser light sources. Unfortunately, in some applications the maximum available power can be insufficient to provide good image quality in bright light environments. Traditional techniques to overcome these limitations have relied upon complex optical elements configured to combine light from multiple distinct lasers. Unfortunately, the optical elements needed to combine light from multiple distinct lasers can be both bulky and expensive.

BRIEF DESCRIPTION OF THE DRAWINGS

FIGS. 2A and 2B show a perspective and top view of a multi-stripe laser in accordance with various embodiments of the present invention;

FIGS. 3A-3B show schematic diagrams of portions of exemplary projected images in accordance with various embodiments of the present invention;

FIGS. 4A-4B show schematic diagrams of portions of exemplary projected images in accordance with various embodiments of the present invention;

FIGS. 5A-5B show schematic diagrams of portions of exemplary projected images in accordance with various embodiments of the present invention;

FIG. 13 shows a perspective view of a gaming apparatus in accordance with various embodiments of the present invention.

DESCRIPTION OF EMBODIMENTS

Figure 1:
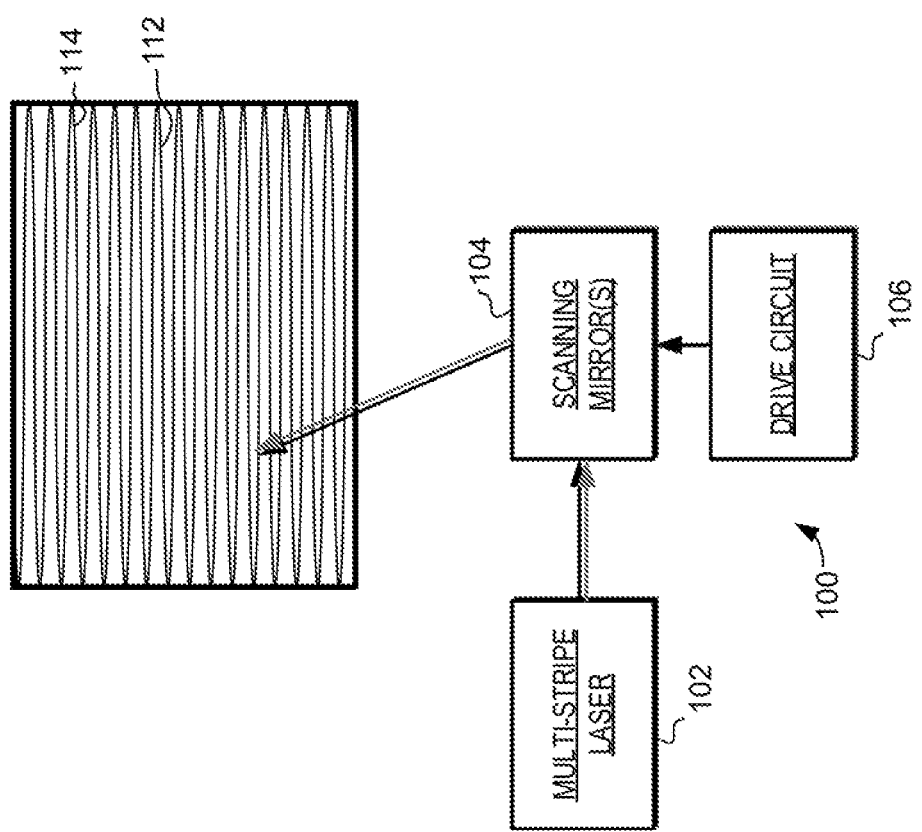
FIG. 1 shows a schematic diagram of a scanning laser projector in accordance with various embodiments of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

In general, the embodiments described herein provide a scanning projector that uses at least one multi-stripe laser to generate the laser light for the scanned image. Specifically, the multi-stripe laser includes at least a first laser element and a second laser element formed together on a semiconductor die. The first laser element is configured to output a first laser light beam, and the second laser element is configured to output a second laser light beam. At least one scanning mirror is configured to reflect the first laser light beam and the second laser light beam, and a drive circuit is configured to provide an excitation signal to excite motion of the at least one scanning mirror. Specifically, the motion is excited such that the at least one scanning mirror reflects the first laser light beam and the second laser light beam in a raster pattern of scan lines.

In various embodiments, the use of a multi-stripe laser with multiple laser elements on a single die can provide improved performance in the scanning projector. For example, a multi-stripe laser with multiple laser elements on a single die can be configured to provide improved image brightness without requiring excessively bulky and/or complex optical elements. In other embodiments, the multi-stripe laser can be configured to provide improved resolution without requiring an increase in the scanning frequency. In other embodiments, the multi-stripe laser can simply provide a more compact scanning laser projector than traditional designs that otherwise can require more bulky and complex optics.

Turning now to FIG. 1, a schematic diagram of a scanning laser projector 100 is illustrated. The scanning laser projector 100 includes a multi-stripe laser 102, scanning mirror(s) 104, and a drive circuit 106. During operation, the multi-stripe laser 102 provides multiple beams of laser light that are each individually encoded with pixel data to generate image pixels that are to be projected by the scanning laser projector 100. To facilitate this, the drive circuit 106 controls the movement of the scanning mirror(s) 104. Specifically, the drive circuit 106 provides excitation signal(s) to excite motion of the scanning mirror(s) 104.

The scanning mirror(s) 104 reflect the laser light beams into an image region 112. Specifically, during operation of the scanning light projector 100, the scanning mirror(s) 104 are controlled by the drive circuit 106 to reflect the multiple beams of laser light into a raster pattern 114. This raster pattern 114 of laser light beams generates a projected image. In general, the horizontal motion of the beams of laser light in this raster pattern 114 define rows of pixels in the projected image, while the vertical motion of the beams of laser light in the raster pattern 114 defines a vertical scan rate and thus the number of rows in the projected image.

In accordance with the embodiments described herein, the multi-stripe laser 102 includes at least a first laser element and a second laser element formed together on a semiconductor die. The first laser element is configured to output a first laser light beam, and the second laser element is configured to output a second laser light beam. In some embodiments the multi-stripe laser 102 can include additional laser elements, including a third and/or fourth laser element. As will be described in greater detail below, in some embodiments the different laser elements in the multi-stripe laser 102 will be configured to output laser beams with substantially the same wavelengths. Such embodiments can be used to provide improved brightness in the projected image.

In other embodiments, the different laser elements in the multi-stripe laser 102 will be configured to output laser beams with substantially different wavelengths. For example, the multi-stripe laser 102 could include different color lasers (e.g., red, green, blue, other visible colors, infrared, and ultraviolet) in a way that facilitates a compact scanning laser projector 100. As will be described in greater detail below, such an embodiment may be implemented with reduced optical complexity and size.

In these various embodiments the multi-stripe laser 102 is implemented such that the multiple laser elements are independently controllable. For example, the first laser element and the second laser element can be independently controllable by pixel generator(s). In general, the pixel generator controls the laser elements to modulate laser beam in a way that generates individual pixels in the scanned image. By independently controlling the multiple laser elements, the different laser beams in the multi-stripe laser 102 can be independently encoded with different pixel data, and thus these differently encoded laser beams can be used to simultaneously generate different pixels in the projected image.

As will be described below, such embodiments can be configured to simultaneously generate pixels in the same row but different columns of the projected image, in the same column but different rows of the projected image, or in both a different row and different column of the projected image.

Because such embodiments use multiple laser elements simultaneously, a scanning laser projector 100 configured in this manner may provide increased image brightness. Furthermore, such increased image brightness may be achieved without requiring the complex optics needed to combine laser beams from separate lasers. In other embodiments, the multiple laser elements can be configured to provide improved resolution without requiring an increase in the scanning frequency. In other embodiments, the multi-stripe laser can simply provide a more compact scanning laser projector than traditional designs that otherwise can require more bulky and complex optics.

Turning now to FIG. 2A, a perspective view of an exemplary multi-stripe laser 200 is illustrated. The exemplary multi-stripe laser 200 includes a first laser element 204 and a second laser element 206 formed together on a single semiconductor die 202. As such, the multi-stripe laser 200 is an example of the type of lasers that can be used in the scanning laser projectors described herein (e.g., scanning laser projector 100). In this illustrated example, the first laser element 204 and the second laser element 206 are formed with parallel diode stripes, with each of the parallel diode stripes defining part of a corresponding laser. In such an arrangement, the first laser element 204 and the second laser element 206 would be configured to output substantially parallel laser beams.

It should be noted that FIG. 2A is a simplified illustration, and thus does not illustrate some features which may be found on a multi-stripe laser. For example, FIG. 2 does not illustrate the contacts that would be used to independently control the first laser element 204 and the second laser element 204. Nor does FIG. 2 illustrate packaging or other such features that may be included.

For example, the multi-stripe laser 200 can also include any suitable semiconductor device or structure configured to implement the multi-stripe lasers. It should be noted that in a typical embodiment, the laser elements 204 and 206 would be formed together on a semiconductor wafer with other fabricated devices, and then the wafer would be singulated into multiple separate die, with a singulated die defining the semiconductor substrate 202. When forming such lasers a variety of different types of semiconductor substrates can be used, including bulk semiconductor die and silicon on insulator (SOI) die.

It should also be noted that multi-stripe laser 200 is just one example of the type of multi-stripe laser that can be used in the various embodiments described herein, and that other implementations of multi-stripe lasers can also be used. For example, while the multi-stripe laser 200 shows a configuration with the first laser element 204 and the second laser element 206 formed side by side on the "top" of the die, in other embodiments, other configurations of the laser elements on the die are possible. For example, the multi-stripe laser elements can be formed in different horizontal layers of the semiconductor die. As other examples, the multi-stripe laser 200 can be formed to include a larger number of laser elements, e.g., three, four, or N such laser elements formed together on a semiconductor die.

It should be noted that in various embodiments it may be desirable to configure the output distance between the laser elements 204 and 206 in the die based on the configuration and use of the laser elements 204 and 206 in the scanning laser projector. For example, the multi-stripe laser 200 can be configured with an output distance between laser elements 204 and 206 that correspond to, or is determined by, the distance between pixels and/or rows in the projected image, taking into account intervening optics such as collimating lenses, dichroics, scanning mirror(s), etc. Thus, the distance between laser elements is such that the output of one laser element can be used for one pixel, while the output of the other laser element is used for an adjacent pixel or a pixel in an adjacent row.

Turning to FIG. 2B, one example implementation of the multi-stripe laser 200 is illustrated. In this example, the laser light outputted by the lasers elements 204 and 206 is passed to a collimating lens 210. Furthermore, in this illustrated example the laser elements 204 and 206 are positioned symmetrically relative to an optical axis 212.

In general, collimating optics such as collimating lens 210 are used to make the beam rays parallel, to provide a low divergence beam with minimum beam spread as the beam rays propagate. When implemented in a scanning laser projector, such a collimating lens 210 can be used to create a beam whose divergence matches pixel growth for a given display (e.g., to match pixel growth for a given field of view and resolution). Specifically, the collimating optics can be used to ensure that the output beams from each of the laser elements 204 and 206 do not expand faster than the expansion rate of the image pixels of the projected image. For such conditions, the use of such a collimating lens 210 provides the displayed image with what appears to be infinite focus. In such an implementation, the distance from the multi stripes laser 200 (i.e., the distance from the edge of the die) to the collimating lens 210 can be configured at a length selected to properly collimate the beam.

As noted above, FIG. 2B illustrates an embodiment where the individual laser elements 204 and 206 are positioned symmetric to the optical axis 212. In such an embodiment, each beam after the collimating lens 210 separates with the same angle from the optical axis 212 as long as the collimating lens 210 is rotationally symmetric and also centered on the optical axis 212. In other embodiments, the laser elements 204 and 206 can be position off axis to create two beams separated angularly from the optical axis 212. For example, a first laser element can positioned on the optical axis 212 and the other laser element positioned off axis. In such an embodiment the centroid of the first beam from the first laser element will propagate along the optical axis 212 and the second beam from the second laser element will propagate with a certain angle from the optical axis 212.

As was noted above with reference to FIG. 1, the multi-stripe laser 102, scanning mirrors 104 and drive circuit 106 can be configured to utilize the multiple laser beams in a variety of ways. Specifically, in various examples the multiple laser beams in the multi-stripe laser 102 can be independently encoded with different pixel data, and thus these differently encoded laser beams can be used to simultaneously generate different pixels in the projected image. As specific examples, the scanning laser projector 100 can be configured to simultaneously generate pixels in the same row but different columns of the projected image, in the same column but different rows of the projected image, or in both a different row and different column of the projected image.

In one specific embodiment, the multi-stripe laser 102, scanning mirrors 104 and drive circuit 106 are configured such that one laser element projects to one row in the projected image while another laser element simultaneously projects to another row in the projected image. Turning to FIG. 3A, a schematic diagram illustrates a portion of two pixel rows in an exemplary projected image 300. In this illustration, the portions of the two rows previously illuminated in this image frame by the scanning motion of the encoded laser beams are indicated by cross-hatching, while the portions not yet illuminated in are not cross-hatched.

Specifically, the illustrated portion of the projected image 300 includes two rows 306 and 308 being generated with a first laser beam 302 and a second laser beam 304, where the two laser beams 302 and 304 are illustrated as arrows pointing to corresponding rows in the projected image 300. Again, the two laser beams 302 and 304 are independently generated using different laser elements in a multi-stripe laser and then reflected into a raster pattern using one or more scanning mirrors, effectively generating pixels in two adjacent rows 306 and 308 simultaneously. Thus, in FIG. 3A, two adjacent rows 306 and 308 in the projected image are being generated by the horizontal scanning motion of first laser beam 302 and the second laser beam 304 as the scanning mirror causes the laser beams 302 and 304 to move left to right in the raster pattern.

Again, it should be noted that in such an embodiment pixels in two rows are simultaneously generated by the first laser beam 302 and the second laser beam 304 respectively. This pattern continues, with two rows being simultaneously generated during horizontal scans, and corresponding vertical motion of reflected laser beams determining the vertical scan rate, until the entire frame of the projected image is generated. In such an embodiment, the number of rows and vertical scan rate in the projected image is determined by the controlled motion of the scanning mirrors and the encoding of pixel data into the laser beams.

Because pixels in two horizontal rows can be simultaneously generated by the two laser beams 302 and 304, the overall brightness of the resulting image can be increased. Specifically, as the two laser beams 302 and 304 scan over the raster pattern, the pixels in each row of the resulting projected image can be illuminated twice, once by each laser element in the multi-stripe laser. Because of the relatively fast scanning motion, this double illumination of each pixel can have the effect of making the projected image appear brighter to a viewer.

However, to ensure that the projected image has consistent brightness it is desirable to ensure that all of the pixels projected image are illuminated twice each frame, i.e., once with each of the two laser beams 302 and 304. Otherwise, rows of pixels that were not illuminated twice would appear noticeably dimmer to a viewer compared to the twice illuminated rows. This could occur at the end rows, e.g., the top and bottom of the projected image where such rows would only be illuminated by one of the laser elements during the raster pattern scan, unless specific steps are taken to ensure otherwise.

Specifically, the motion of the scanning mirrors and the generating of the laser beams 302 and 304 can be controlled to eliminate the possibility of relatively dim top and bottom rows. This can be accomplished by illuminating the pixels in top and bottom rows a second time with the laser element corresponding to the "inside" of the projected image while turning off the laser element corresponding to the "outside" of the projected image. The second illumination by the inside laser element ensures that the rows at the top and bottom edges of the frame are illuminated twice and thus have the same brightness as the interior rows, while turning off the outside laser during this scan ensures that a new dim edge row of pixels is not generated at the same time with the outside laser. It should be noted that which laser element corresponds to the "inside" of the projected image and which laser element corresponds to the "outside" would depend on the configuration of the laser elements and whether the bottom or top of the image is being illuminated.

Turning now to FIG. 3B, an exemplary projected image 350 is illustrated. The boundaries of the projected image 350 are defined by a perimeter 352, where the perimeter is indicated by the relatively thick line. Again, the illumination of the projected image by the laser elements is indicated by cross-hatching. As can be seen in FIG. 3B, the relative arrangement and motion of the laser beams is such that the pixel rows in the interior region inside the perimeter 352 are illuminated twice, once with each laser element, while a top exterior region 354 and the bottom exterior region 356 would each be illuminated only once. Again, this can cause the pixels in the top and bottom rows of the image to be unacceptably dim compared to the other rows.

To alleviate such issues, the individual lasers elements in the multi-stripe laser can be controlled to selectively turn off when their corresponding laser beams would be projecting in either the top exterior region 354 and the bottom exterior region 356, while the other laser element is in the multi-stripe laser projects a second scan into the last row inside the perimeter 352. Stated another way, when the top of the image frame is reached, the "outside" laser can be turned off while the top row inside the perimeter 352 is given a second scan by the "inside" laser. Likewise, when the bottom of the image frame is reached, the "outside" laser can be turned off while the bottom row inside the perimeter 352 is given a second scan by the "inside" laser. Thus, all of the rows inside the perimeter 352 are illuminated twice, once with each laser element, while laser light is not projected into the top exterior region 354 and the bottom exterior region 356.

While the example of FIG. 3A has been described as facilitating increased image brightness in some embodiments, such an example can also be used to increase the resolution of the projected image without requiring an increase in the scanning frequency. Specifically, because the example of FIG. 3A is able to generate multiple rows of pixels simultaneously, such an embodiment can be implemented to increase the number of rows in an image frame without requiring a corresponding increase in the mirror scanning rate or the number of horizontal scans per frame. In such an embodiment, the scanning can be performed such that each horizontal scan fully generates two rows of pixels in the projected image, and with the beam size and/or vertical scanning rate configured such that subsequent scans do not overlap the previously generated rows. Thus, double the number of rows in the image frame can be generated without an increase in the number of horizontal scans used to generate that image. Alternatively, the same number of rows can be generated in the image frame with half the number of horizontal scans.

While FIGS. 3A and 3B illustrate examples where pixels in different rows are generated simultaneously, this is just one example implementation. As another example embodiment, the multi-stripe laser 102, scanning mirrors 104 and drive circuit 106 can configured such that the two laser elements project into the same row in the projected image. Turning to FIG. 4A, a schematic diagram illustrates a portion of one pixel row 406 in an exemplary projected image 400. In this illustration, the portion of the row 406 previously illuminated in this image frame by the scanning motion of the encoded laser beams is indicated by cross-hatching, while the portion not yet illuminated in is not cross-hatched.

Specifically, the illustrated portion of the projected image 400 shows that the row 406 is being generated with a first laser beam 402 and a second laser beam 404, where the two laser beams 402 and 404 are illustrated as arrows pointing to corresponding rows in the projected image 400. Again, the two laser beams 402 and 404 are independently generated using different laser elements in a multi-stripe laser and then reflected into a raster pattern using one or more scanning mirrors, effectively generating two different pixels in the same row simultaneously. Thus, in FIG. 4A, two pixels in row 406 are being generated by the horizontal scanning motion of first laser beam 402 and the second laser beam 404 as the scanning mirror causes the laser beams 402 and 404 to move left to right in the raster pattern.

Again, it should be noted that in such an embodiment two pixels in the same row 406 are simultaneously generated by the first laser beam 402 and the second laser beam 404 respectively. This pattern continues, with rows generated during horizontal scans, and corresponding vertical motion of reflected laser beams determining the vertical scan rate, until the entire frame of the projected image is generated. In such an embodiment, the number of rows and vertical scan rate in the projected image is again determined by the controlled motion of the scanning mirrors and the encoding of pixel data into the laser beams.

Because pixels can be simultaneously generated by the two laser beams 402 and 404, the overall brightness of the resulting image can be increased. Specifically, as the two laser beams 402 and 404 scan over the raster pattern, each pixel in a row of the projected image can be illuminated twice, once by each laser element in the multi-stripe laser. Because of the relatively fast scanning motion, this double illumination of each pixel can have the effect of making the projected image appear brighter to a viewer.

However, to ensure that the projected image has consistent brightness it is again desirable to ensure that all of the pixels projected image are illuminated twice each frame, i.e., once with each of the two laser beams 402 and 404. Otherwise, pixels that that were not illuminated twice would appear noticeably dimmer to a viewer compared to the twice illuminated pixels. In the example of FIG. 4, this could occur at the edges of the rows, e.g., the left and right sides of the projected image where such pixels would only be illuminated by one of the laser elements during the raster pattern scan, unless specific steps are taken to ensure otherwise.

Specifically, the motion of the scanning mirrors and the generating of the laser beams 402 and 404 can again be controlled to eliminate the possibility of relatively dim pixels at the left and right edges of the projected images. Again, this can be accomplished by illuminating the pixels at the edges a second time with the laser element corresponding to the "inside" of the projected image while turning off the laser element corresponding to the "outside" of the projected image. The second illumination by the inside laser ensures that the pixels at the left and right edges of the frame are illuminated twice and thus have the same brightness as the interior pixels, while turning off the outside laser during this scan ensures that a new dim pixels is not generated at the same time with the outside laser. It should be noted that which laser element corresponds to the "inside" of the projected image and which laser element corresponds to the "outside" would depend on the configuration of the laser elements and whether the right or left edge of the image is being illuminated.

Turning now to FIG. 4B, an exemplary projected image 450 is illustrated. The boundaries of the projected image 450 are defined by a perimeter 452, where the perimeter is indicated by the relatively thick line. Again, the illumination of the projected image by the laser elements is indicated by cross-hatching. As can be seen in FIG. 4B, the relative arrangement and motion of the laser beams is such that the pixel rows in the interior region inside the perimeter 452 are illuminated twice, once with each laser element, while a left exterior region 454 and a right exterior region 456 would each be illuminated only once. Again, this can cause the pixels at the left and right edges of the image to be unacceptably dim compared to interior pixels.

To alleviate such issues, the individual lasers elements in the multi-stripe laser can be controlled to selectively turn off when their corresponding laser beams would be projecting in either the left exterior region 454 or the right exterior region 456, while the other laser element is in the multi-stripe laser projects a second scan into the last pixel inside the perimeter 452. Stated another way, when the left edge of the image frame is reached, the "outside" laser can be turned off while the last pixel inside the perimeter 452 is given a second scan by the "inside" laser. Likewise, when the right edge of the image frame is reached, the "outside" laser can be turned off while the last pixel inside the perimeter 452 is given a second scan by the "inside" laser. Thus, all of the pixels inside the perimeter 452 are illuminated twice, once with each laser element, while laser light is not projected into the left exterior region 454 and the right exterior region 456.

While FIGS. 3A and 3B illustrate examples where pixels in different rows but the same columns are generated simultaneously by the two laser elements, and FIGS. 4A and 4B illustrate examples where pixels in the same row but different columns are generated simultaneously, these are again just examples. As another example embodiment, the multi-stripe laser 102, scanning mirrors 104 and drive circuit 106 can configured such that the two laser elements project simultaneously into pixels that are both in different columns and different rows. Turning to FIG. 5A, a schematic diagram illustrates a portion of two pixel rows in an exemplary projected image 500. Specifically, the illustrated portion of the projected image 500 includes two rows 506 and 508 being generated with a first laser beam 502 and a second laser beam 504, where the two laser beams 502 and 504 are illustrated as arrows pointing to corresponding rows in the projected image 500. Again, the two laser beams 502 and 504 are independently generated using different laser elements in a multi-stripe laser and then reflected into a raster pattern using one or more scanning mirrors, effectively generating pixels in two adjacent rows 506 and 508 simultaneously. In contrast with the example of FIG. 3, the two lasers beams 502 and 504 are directed to pixels in different columns. Stated another way, the laser beams 502 and 504 are offset with regard to both rows and columns in the projected image.

In FIG. 5A, two adjacent rows 506 and 508 in the projected image are being generated by the horizontal scanning motion of first laser beam 502 and the second laser beam 504 as the scanning mirror causes the laser beams 502 and 504 to move left to right in the raster pattern. And again, as the two laser beams 502 and 504 scan over the raster pattern, the pixels in each row of the resulting projected image can be illuminated twice, once by each laser element in the multi-stripe laser. Because of the relatively fast scanning motion, this double illumination of each pixel can have the effect of making the projected image appear brighter to a viewer.

However, to again ensure that the projected image has consistent brightness it is desirable to ensure that all of the pixels projected image are illuminated twice each frame, i.e., once with each of the two laser beams 502 and 504. Turning now to FIG. 5B, an exemplary projected image 550 is illustrated. The boundaries of the projected image 550 are defined by a perimeter 552, where the perimeter is indicated by the relatively thick line. Again, the illumination of the projected image by the laser elements is indicated by cross-hatching. As can be seen in FIG. 5B, the relative arrangement and motion of the laser beams is such that the pixel rows in the interior region inside the perimeter 552 are illuminated twice, once with each laser element, while an exterior region 554 and an exterior region 556 would each be illuminated only once. To again alleviate such issues, the individual lasers elements in the multi-stripe laser can be controlled to selectively turn off when their corresponding laser beams would be projecting in either the exterior region 554 or the exterior region 556, while the other laser element is in the multi-stripe laser projects a second scan into pixels at inside edge of the perimeter 552. Thus, all of the pixels inside the perimeter 452 are illuminated twice, once with each laser element, while laser light is not projected into the exterior region 554 and the exterior region 556.

In the examples of FIGS. 3, 4 and 5, two laser elements were included in the multi-stripe laser and used to generate the projected. Again, this is just one example, and in some embodiments additional laser elements can be included the multi-stripe laser and used to generated the projected images. Turning now to FIGS. 6A, 6B, 6C, 6D, 6E and 6F, these figures show additional corresponding examples with three laser elements used to generate projected images. Like the previously illustrated examples, such an implementation can increase the brightness of the projected image. In this case, each pixel in the projected image can be scanned three times per frame, further increasing the brightness compared to examples that use two laser elements in the multi-stripe laser to scan each pixel twice.

And like the previous examples, it would generally be desirable to selectively turn off laser elements when their corresponding laser beams would be projecting in an exterior region, while the other laser element or (or laser elements) in the multi-stripe laser projects a second (or third) scan into pixels inside the perimeter. Thus, all of the pixels inside the perimeter can be illuminated three times, once with each laser element, while laser light is not projected into the exterior regions.

Figure 6A:
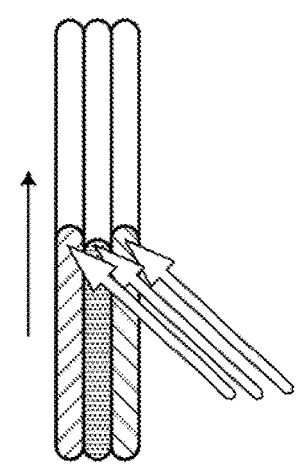
FIGS. 6A, 6B, 6C, 6D, 6E and 6F show schematic diagrams of portions of exemplary projected images in accordance with various embodiments of the present invention.
Figure 6C:
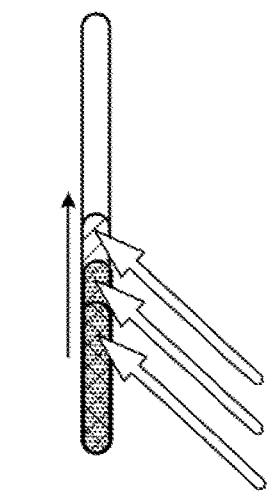
Figure 6E:
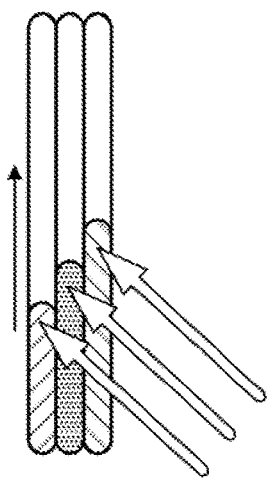
Figure 6B:
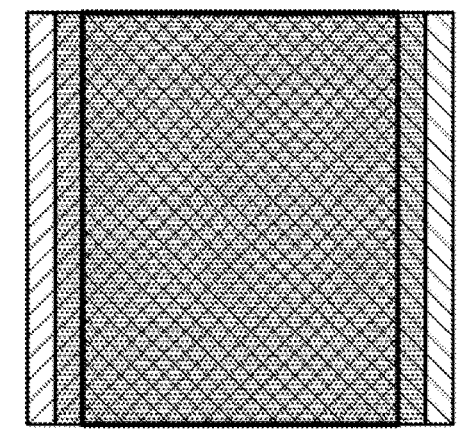
Figure 6D:
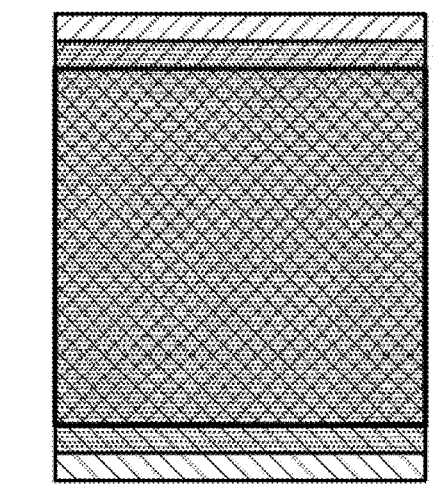
Figure 6F:
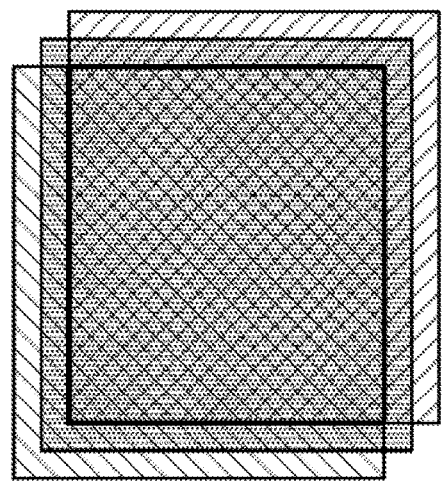

Furthermore, it should be noted that the example of FIG. 6A can also be used to increase the resolution of the projected image without requiring an increase in the scanning frequency. Specifically, because the example of FIG. 6A is able to generate three rows of pixels simultaneously, such an embodiment can be implemented to triple the number of rows in an image frame without requiring a corresponding increase in the mirror scanning rate or the number of horizontal scans per frame. Alternatively, the same number of rows can be generated in the image frame with one-third the number of horizontal scans. In such embodiments, the scanning can be performed such that each horizontal scan fully generates three rows of pixels in the projected image, and with the vertical scanning rate configured such that subsequent scans do not overlap the previously generated rows.

Figure 7A:
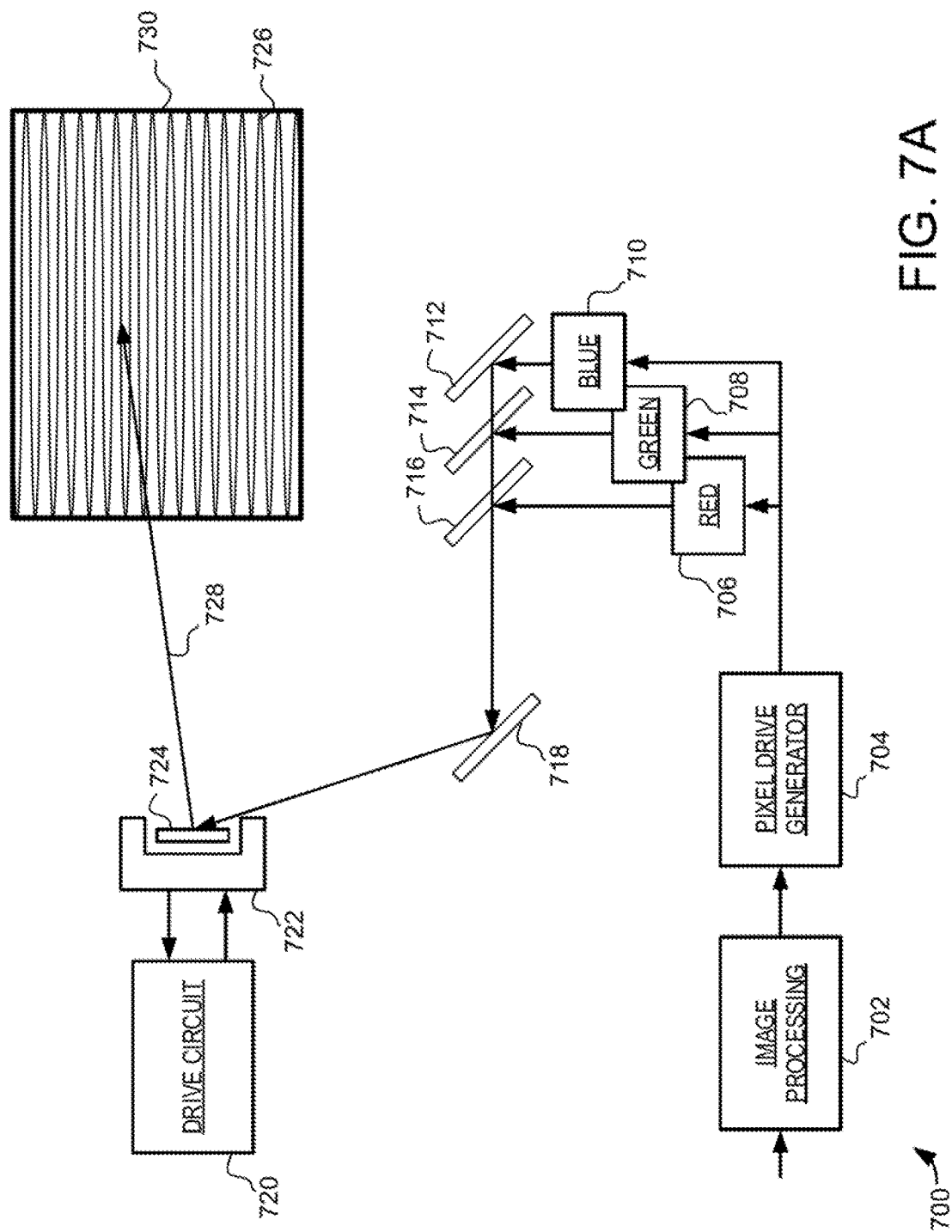
FIGS. 7A and 7B shows a schematic view of scanning laser projectors in accordance with various embodiments of the present invention.

Turning now to FIG. 7A, a schematic view of a scanning laser projector 700 is illustrated. The scanning laser projector 700 is a more detailed example of the type of system that can be used in accordance with various embodiments of the present invention. Scanning laser projector 700 includes an image processing component 702, a pixel drive generator 704, a red laser module 706, a green laser module 708, and a blue laser module 710. Light from the three laser modules is combined with dichroics 712, 714, and 716. Scanning laser projector 700 also includes fold mirror 718, drive circuit 720, and MEMS device 722 with scanning mirror 724.

In operation, image processing component 702 processes video content at using two dimensional interpolation algorithms to determine the appropriate spatial image content for each scan position at which an output pixel is to be displayed by the pixel drive generator. For example, the video content may represent a grid of pixels at any resolution (e.g., 640×480, 848×480, 1280×720, 1920×1080). The input light intensity encoding typically represents the light intensity in 8, 10, 12 bit or higher resolutions.

This content is then mapped to a commanded current for each of the red, green, and blue laser sources such that the output intensity from the lasers is consistent with the input image content. In some embodiments, this process occurs at output pixel rates in excess of 150 MHz. The laser beams are then directed onto an ultra-high speed gimbal mounted 2 dimensional bi-axial laser scanning mirror 724. In some embodiments, this bi-axial scanning mirror is fabricated from silicon using MEMS processes. The vertical axis of rotation is operated quasi-statically and creates a vertical sawtooth raster trajectory. The vertical axis is also referred to as the slow-scan axis. The horizontal axis is operated on a resonant vibrational mode of the scanning mirror. In some embodiments, the MEMS device uses electromagnetic actuation, achieved using a miniature assembly containing the MEMS die and small subassemblies of permanent magnets and an electrical interface, although the various embodiments are not limited in this respect. For example, some embodiments employ electrostatic or piezoelectric actuation. Any type of mirror actuation may be employed without departing from the scope of the present invention.

The horizontal resonant axis is also referred to as the fast-scan axis. In some embodiments, raster pattern 726 is formed by combining a sinusoidal component on the horizontal axis and a sawtooth component on the vertical axis. In these embodiments, output beam 728 sweeps back and forth left-to-right in a sinusoidal pattern, and sweeps vertically (top-to-bottom) in a sawtooth pattern with the display blanked during flyback (bottom-to-top).

It should be noted that FIG. 7 illustrates the sinusoidal pattern as the beam sweeps vertically top-to-bottom, but does not show the flyback from bottom-to-top. In other embodiments, the vertical sweep is controlled with a triangular wave such that there is no flyback. In still further embodiments, the vertical sweep is sinusoidal. The various embodiments of the invention are not limited by the waveforms used to control the vertical and horizontal sweep or the resulting raster pattern 726.

The drive circuit 720 provides a drive signal to MEMS device 722. The drive signal includes an excitation signal to control the resonant angular motion of scanning mirror 724 on the fast-scan axis, and also includes slow scan drive signal to cause deflection on the slow-scan axis. The resulting mirror deflection on both the fast and slow-scan axes causes output beam 728 to generate a raster scan 726 in an image region 730. In operation, the laser light sources produce light pulses for each output pixel and scanning mirror 724 reflects the light pulses as beam 728 traverses the raster pattern 726. Drive circuit 720 also receives a feedback signal from MEMS device 722. The feedback signal from the MEMS device 722 can describe the maximum deflection angle of the mirror, also referred to herein as the amplitude of the feedback signal. This feedback signal is provided to the drive circuit 720, and is used by the drive circuit 720 to accurately control the motion of the scanning mirror 724.

In operation, drive circuit 720 excites resonant motion of scanning mirror 724 such that the amplitude of the feedback signal is constant. This provides for a constant maximum angular deflection on the fast-scan axis as shown in raster pattern 726. The excitation signal used to excite resonant motion of scanning mirror 724 can include an amplitude and a phase. Drive circuit 720 includes feedback circuit(s) that modifies the excitation signal amplitude to keep the feedback signal amplitude substantially constant. Additionally, the drive circuit 720 can modify the excitation signal to control the horizontal phase alignment and vertical position of the raster pattern 726.

To facilitate this, drive circuit 720 may be implemented in hardware, a programmable processor, or in any combination. For example, in some embodiments, drive circuit 720 is implemented in an application specific integrated circuit (ASIC). Further, in some embodiments, some of the faster data path control is performed in an ASIC and overall control is provided by a software programmable microprocessor.

It should be noted that while FIG. 7A illustrates an embodiment with a single MEMS device 722 and a single scanning mirror 724, that this is just one example implementation. As another example, a scanning laser projector could instead be implemented with scanning mirror assembly that includes two scanning mirrors, with one mirror configured to deflect along one axis and another mirror configured to deflect along a second axis that is largely perpendicular to the first axis.

Such an embodiment could include a second MEMS device, a second scanning mirror, and a second drive circuit. The first scanning mirror could be configured to generate horizontal scanning motion, and the second scanning mirror configured to generate vertical motion. Thus, the motion of one scanning mirror determines the horizontal scan amplitude and the motion of the other scanning mirror determines the vertical scan amplitude.

In operation, drive circuit 720 excites resonant motion of scanning mirror 724 such that the amplitude of the feedback signal is constant. This provides for a constant maximum angular deflection on the fast-scan axis as shown in raster pattern 726. The excitation signal used to excite resonant motion of scanning mirror 724 can include an amplitude and a phase. Drive circuit 720 includes feedback circuit(s) that modifies the excitation signal amplitude to keep the feedback signal amplitude substantially constant. Additionally, the drive circuit 720 can modify the excitation signal to control the horizontal phase alignment and vertical position of the raster pattern 726.

In accordance with the embodiments described herein, the red, green and/or blue laser light modules shown in FIG. 7A can each be implemented with a multi-stripe laser that includes multiple laser elements formed together on a single die. In this embodiment, the multiple laser elements would be configured to output laser beams with substantially the same the wavelengths for each color. Thus, the red, green and blue laser light modules 706, 708 and 710 could each comprise its own multi-stripe laser formed on its own die and having multiple lasers elements that output at substantially the same wavelengths. It should be noted that it is not required that each color module use a multi-stripe laser, and that in some embodiments only certain colors would use multi-stripe lasers. For example, when only certain colors need an increase in brightness. Furthermore, the number of laser elements in the multi-stripe laser could be varied for each color. Again, for example, when the need to increase the brightness of the individual colors varies. Furthermore, it should be noted that while the laser light modules are described as including red, green and blue laser elements, that in other embodiments other visible color combinations can be used. Additionally, non-visible lasers elements such as infrared and ultraviolet can be included in some embodiments.

In these various embodiments the multi-stripe laser implementing the laser light modules would be configured such that the laser elements are independently controllable. For example, the first laser element and the second laser element for each color can be independently controllable by pixel generator 704. Thus, the pixel drive generator 704 can drive the multiple laser elements to generate the appropriate pixels. To facilitate this, the pixel generator 704 can be configured with one or more buffers, with the buffers used to ensure that the data for each pixel is available when that pixel is being generated by a particular laser element. For example, such buffers can be used to provide pixel data multiple times when such pixels are being scanned multiple times per frame.

In such embodiments, the size of the buffers used by the pixel generator 704 can depend on the configuration of the multiple laser elements and how the multiple laser elements are being used to generate pixels. For example, when the multiple laser elements are each being used to simultaneously scan pixels in the same row (e.g., as in the example of FIG. 4A) the time difference between the first scan of a pixel and subsequent scans of the same pixel is relatively short and thus a relatively smaller buffer can typically be used. Alternatively, when the multiple laser elements are being used to simultaneously scan pixels in different rows (e.g., as in the examples of FIGS. 3A and 5A) a relatively larger buffer may be required, as the time delay between when a pixel is first scanned and is then scanned again can be relatively large.

Thus, by independently controlling the multiple laser elements in the multi-stripe lasers for each color using the pixel drive generator 704, the different laser beams for each laser light module can be independently encoded with different pixel data, and thus these differently encoded laser beams can be used to simultaneously generate different pixels in the projected image.

And as was described above, such embodiments can be configured to simultaneously generate pixels in the same row but different columns of the projected image, in the same column but different rows of the projected image, or in both a different row and different column of the projected image.

Finally, although red, green, and blue laser light sources are shown in FIG. 7A, the various embodiments are not limited by the wavelength of light emitted by the laser light sources. For example, in some embodiments, non-visible light (e.g., infrared light) is emitted instead of, or in addition to, visible light.

Figure 7B:
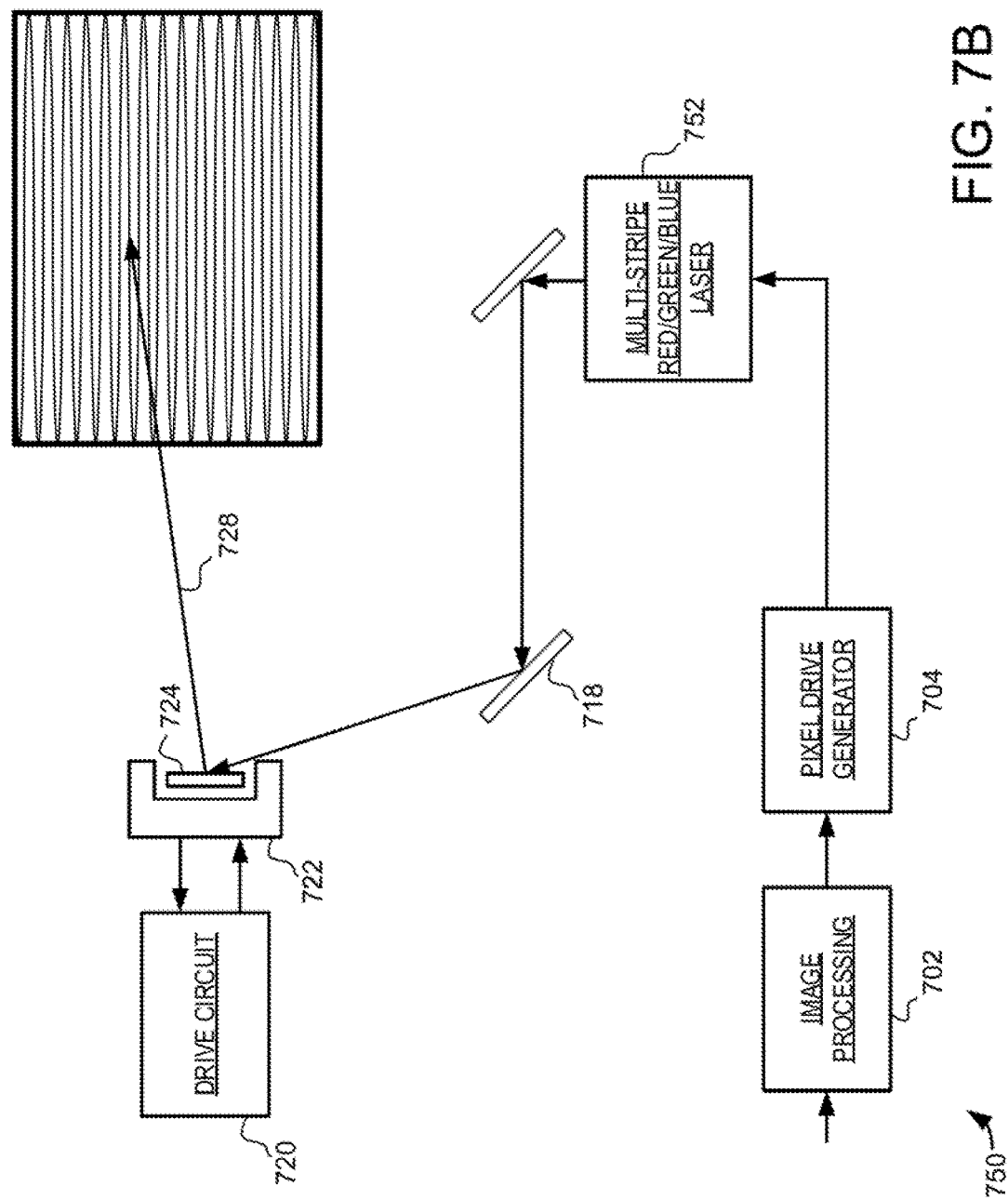

Turning now to FIG. 7B, a schematic view of a scanning laser projector 700 is illustrated. The scanning laser projector 750 is another example of the type of system that can be used in accordance with various embodiments of the present invention. Scanning laser projector 750 is similar to that of projector 700 illustrated in FIG. 7A, but instead uses a single multi-stripe laser 752 in place of the separate red, green and blue laser modules.

For example, in such an embodiment multi-stripe laser 752 could thus include at least three laser elements, with one laser element for each color red, green and blue. Such an embodiment can provide relatively compact projector, as all three colors can be combined with fewer optical elements to implement the projector. For example, the various combiner optics used in other projectors may not be required when all of the laser elements for all colors are implemented on the same multi-stripe laser.

Furthermore, in some embodiments additional laser elements could be included, such that multiple laser elements for each color are included in the multi-stripe laser 752. Such an embodiment could additionally provide increased brightness.

Again, in these various embodiments the multi-stripe laser implementing the laser light modules would be configured such that the laser elements are independently controllable. For example, the first laser element and the second laser element for each color can be independently controllable by pixel generator 704. By independently controlling the multiple laser elements in the multi-stripe lasers for each color, the different laser beams for each laser light module can be independently encoded with different pixel data, and thus these differently encoded laser beams can be used to simultaneously generate different pixels in the projected image.

Figure 8:
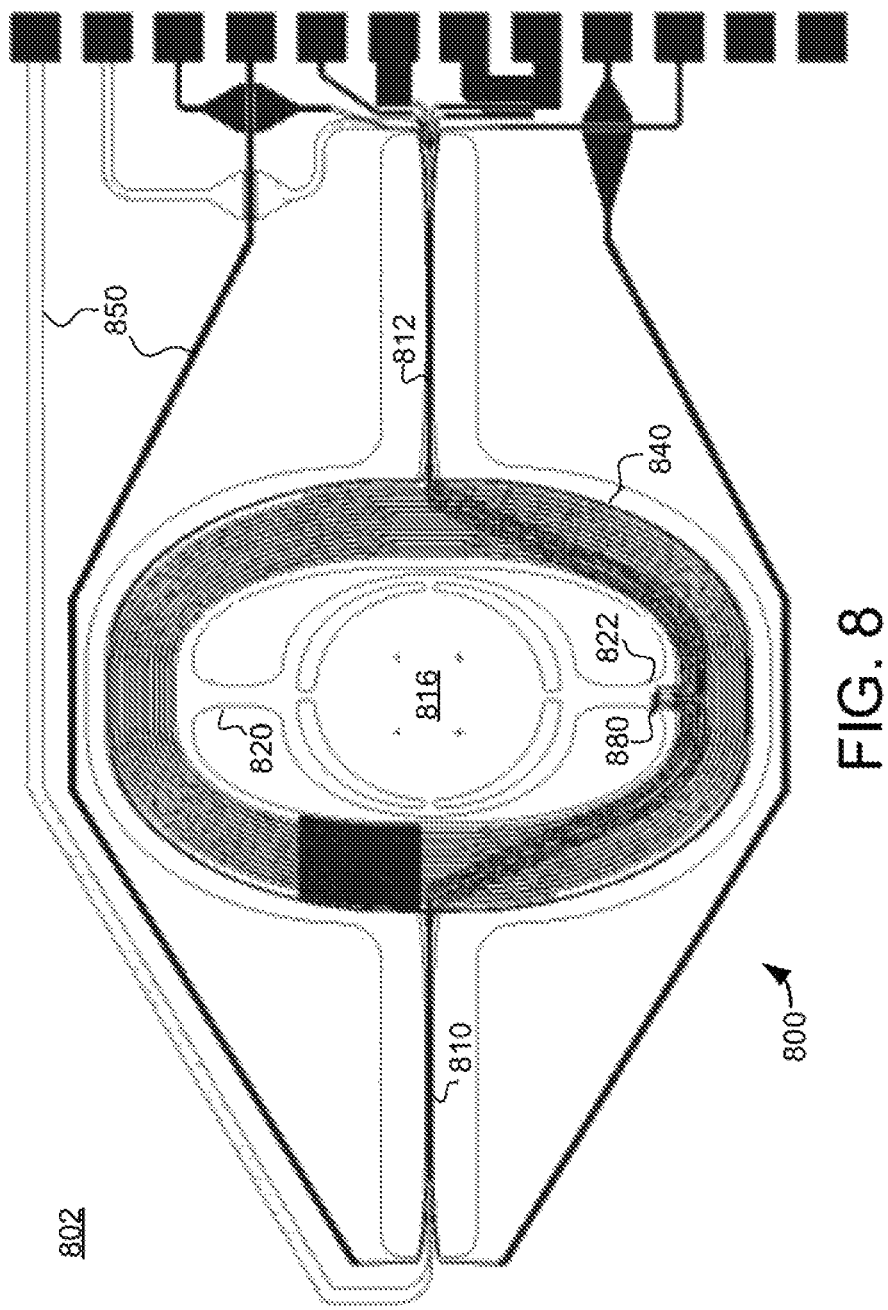
FIG. 8 shows a plan view of a microelectromechanical system (MEMS) device with a scanning mirror in accordance with various embodiments of the present invention.

Turning now to FIG. 8, a plan view of a microelectromechanical system (MEMS) device with a scanning mirror is illustrated. MEMS device 800 includes fixed platform 802, scanning platform 840, and scanning mirror 816. Scanning platform 840 is coupled to fixed platform 802 by flexures 810 and 812, and scanning mirror 16 is coupled to scanning platform 840 by flexures 820 and 822. Scanning platform 840 has a drive coil connected to drive lines 850, which are driven by a drive signal provided from a drive circuit (e.g., drive circuit 720). The drive signal includes an excitation signal to excite resonant motion of scanning mirror 816 on the fast-scan axis, and also includes a slow-scan drive signal to cause non-resonant motion of scanning platform 840 on the slow-scan axis. Current drive into drive lines 850 produces a current in the drive coil. In operation, an external magnetic field source (not shown) imposes a magnetic field on the drive coil. The magnetic field imposed on the drive coil by the external magnetic field source has a component in the plane of the coil, and is oriented non-orthogonally with respect to the two drive axes. The in-plane current in the coil windings interacts with the in-plane magnetic field to produce out-of-plane Lorentz forces on the conductors. Since the drive current forms a loop on scanning platform 840, the current reverses sign across the scan axes. This means the Lorentz forces also reverse sign across the scan axes, resulting in a torque in the plane of and normal to the magnetic field. This combined torque produces responses in the two scan directions depending on the frequency content of the torque.

The long axis of flexures 810 and 812 form a pivot axis. Flexures 810 and 812 are flexible members that undergo a torsional flexure, thereby allowing scanning platform 840 to rotate on the pivot axis and have an angular displacement relative to fixed platform 802. Flexures 810 and 812 are not limited to torsional embodiments as shown in FIG. 8. For example, in some embodiments, flexures 810 and 812 take on other shapes such as arcs, "S" shapes, or other serpentine shapes. The term "flexure" as used herein refers to any flexible member coupling a scanning platform to another platform (scanning or fixed), and capable of movement that allows the scanning platform to have an angular displacement with respect to the other platform.

Scanning mirror 816 pivots on a first axis formed by flexures 820 and 822, and pivots on a second axis formed by flexures 810 and 812. The first axis is referred to herein as the horizontal axis or fast-scan axis, and the second axis is referred to herein as the vertical axis or slow-scan axis. In some embodiments, scanning mirror 816 scans at a mechanically resonant frequency on the horizontal axis resulting in a sinusoidal horizontal sweep. Further, in some embodiments, scanning mirror 816 scans vertically at a nonresonant frequency, so the vertical scan frequency can be controlled independently.

In a typical embodiment the MEMS device 800 will also incorporates one or more integrated piezoresistive position sensors. For example, piezoresistive sensor 880 can be configured to produces a voltage that represents the displacement of mirror 816 with respect to scanning platform 840, and this voltage can be provided back to the drive circuit. Furthermore, in some embodiments, positions sensors are provided on one scan axis while in other embodiments position sensors are provided for both axes.

It should be noted that the MEMS device 800 is provided as an example, and the various embodiments of the invention are not limited to this specific implementation. For example, any scanning mirror capable of sweeping in two dimensions to reflect a light beam in a raster pattern may be incorporated without departing from the scope of the present invention. Also for example, any combination of scanning mirrors (e.g., two mirrors: one for each axis) may be utilized to reflect a light beam in a raster pattern. Further, any type of mirror drive mechanism may be utilized without departing from the scope of the present invention. For example, although MEMS device 800 uses a drive coil on a moving platform with a static magnetic field, other embodiments may include a magnet on a moving platform with drive coil on a fixed platform. Further, the mirror drive mechanism may include an electrostatic drive mechanism.

The scanning laser projectors described above (e.g., scanning laser projector 100 of FIG. 1) can be implemented in a wide variety of devices and for a wide variety of applications. Several specific examples of these types of devices will not be discussed with reference to FIGS. 9-14. In each case, the various embodiments described above can be implemented with or as part of such a device.

Figure 9:
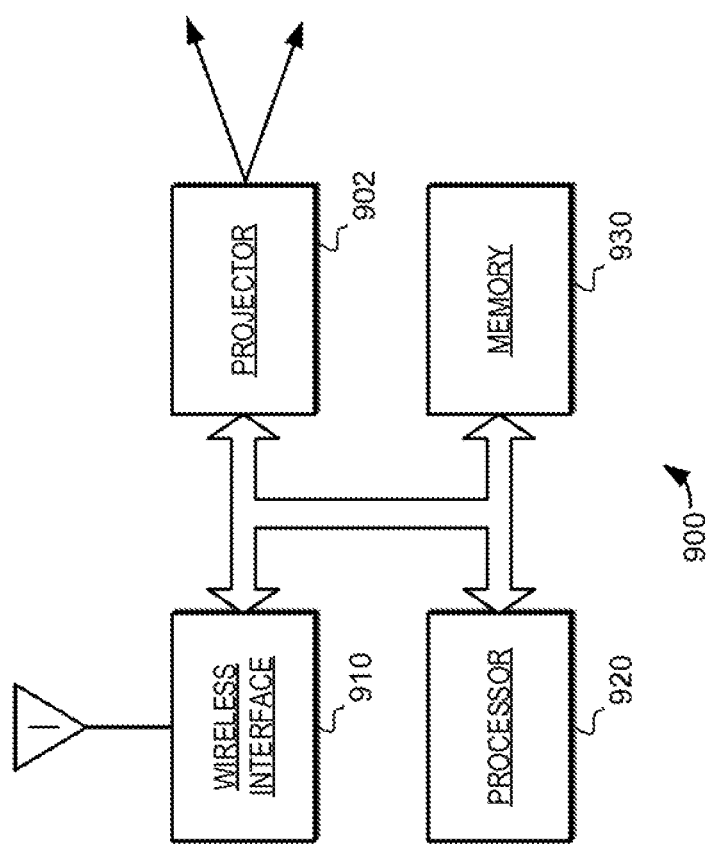
FIG. 9 shows a block diagram of a mobile device in accordance with various embodiments of the present invention.

Turning to FIG. 9, a block diagram of a mobile device 900 in accordance with various embodiments is illustrated. Specifically, mobile device 900 is an example of the type of device in which a scanning laser projector as described above can be implemented (e.g., scanning laser projector 100, scanning laser projector 700). As shown in FIG. 9, mobile device 900 includes wireless interface 910, processor 920, memory 930, and scanning laser projector 902. Scanning laser projector 902 includes photodetector(s) configured in an over scanned region signal to provide feedback signal(s) as described above. Scanning laser projector 902 may receive image data from any image source.

For example, in some embodiments, scanning laser projector 902 includes memory that holds still images. In other embodiments, scanning laser projector 902 includes memory that includes video images. In still further embodiments, scanning laser projector 902 displays imagery received from external sources such as connectors, wireless interface 910, a wired interface, or the like.

Wireless interface 910 may include any wireless transmission and/or reception capabilities. For example, in some embodiments, wireless interface 910 includes a network interface card (NIC) capable of communicating over a wireless network. Also for example, in some embodiments, wireless interface 910 may include cellular telephone capabilities. In still further embodiments, wireless interface 910 may include a global positioning system (GPS) receiver. One skilled in the art will understand that wireless interface 910 may include any type of wireless communications capability without departing from the scope of the present invention.

Processor 920 may be any type of processor capable of communicating with the various components in mobile device 900. For example, processor 920 may be an embedded processor available from application specific integrated circuit (ASIC) vendors, or may be a commercially available microprocessor. In some embodiments, processor 920 provides image or video data to scanning laser projector 100. The image or video data may be retrieved from wireless interface 910 or may be derived from data retrieved from wireless interface 910. For example, through processor 920, scanning laser projector 902 may display images or video received directly from wireless interface 910. Also for example, processor 920 may provide overlays to add to images and/or video received from wireless interface 910, or may alter stored imagery based on data received from wireless interface 910 (e.g., modifying a map display in GPS embodiments in which wireless interface 910 provides location coordinates).

Figure 10:
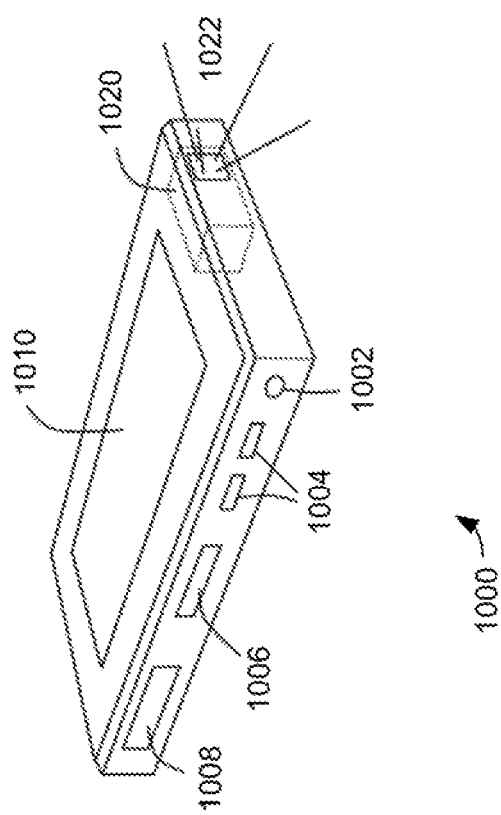
FIG. 10 shows a perspective view of a mobile device in accordance with various embodiments of the present invention.

Turning to FIG. 10, a perspective view of a mobile device 1000 in accordance with various embodiments is illustrated. Specifically, mobile device 1000 is an example of the type of device in which a scanning laser projector as described above can be implemented (e.g., scanning laser projector 100, scanning laser projector 700). Mobile device 1000 may be a hand held scanning laser projector with or without communications ability. For example, in some embodiments, mobile device 1000 may be a scanning laser projector with little or no other capabilities. Also for example, in some embodiments, mobile device 1000 may be a device usable for communications, including for example, a cellular phone, a smart phone, a tablet computing device, a global positioning system (GPS) receiver, or the like. Further, mobile device 1000 may be connected to a larger network via a wireless (e.g., cellular), or this device can accept and/or transmit data messages or video content via an unregulated spectrum (e.g., WiFi) connection.

Mobile device 1000 includes scanning laser projector 1020, touch sensitive display 1010, audio port 1002, control buttons 1004, card slot 1006, and audio/video (A/V) port 1008. None of these elements are essential. For example, mobile device may only include scanning laser projector 1020 without any of touch sensitive display 1010, audio port 1002, control buttons 1004, card slot 1006, or A/V port 1008. Some embodiments include a subset of these elements. For example, an accessory projector may include scanning laser projector 1020, control buttons 1004 and A/V port 1008. A smartphone embodiment may combine touch sensitive display device 1010 and projector 1020.

Touch sensitive display 1010 may be any type of display. For example, in some embodiments, touch sensitive display 1010 includes a liquid crystal display (LCD) screen. In some embodiments, display 1010 is not touch sensitive. Display 1010 may or may not always display the image projected by scanning laser projector 1020. For example, an accessory product may always display the projected image on display 1010, whereas a mobile phone embodiment may project a video while displaying different content on display 1010. Some embodiments may include a keypad in addition to touch sensitive display 1010. A/V port 1008 accepts and/or transmits video and/or audio signals. For example, A/V port 1008 may be a digital port, such as a high definition multimedia interface (HDMI) interface that accepts a cable suitable to carry digital audio and video data. Further, A/V port 1008 may include RCA jacks to accept or transmit composite inputs. Still further, A/V port 1008 may include a VGA connector to accept or transmit analog video signals.

In some embodiments, mobile device 1000 may be tethered to an external signal source through A/V port 1008, and mobile device 1000 may project content accepted through A/V port 1008. In other embodiments, mobile device 1000 may be an originator of content, and A/V port 1008 is used to transmit content to a different device.

Audio port 1002 provides audio signals. For example, in some embodiments, mobile device 1000 is a media recorder that can record and play audio and video. In these embodiments, the video may be projected by scanning laser projector 1020 and the audio may be output at audio port 1002.

Mobile device 1000 also includes card slot 1006. In some embodiments, a memory card inserted in card slot 1006 may provide a source for audio to be output at audio port 1002 and/or video data to be projected by scanning laser projector 1020. Card slot 1006 may receive any type of solid state memory device, including for example secure digital (SD) memory cards.

Figure 11:
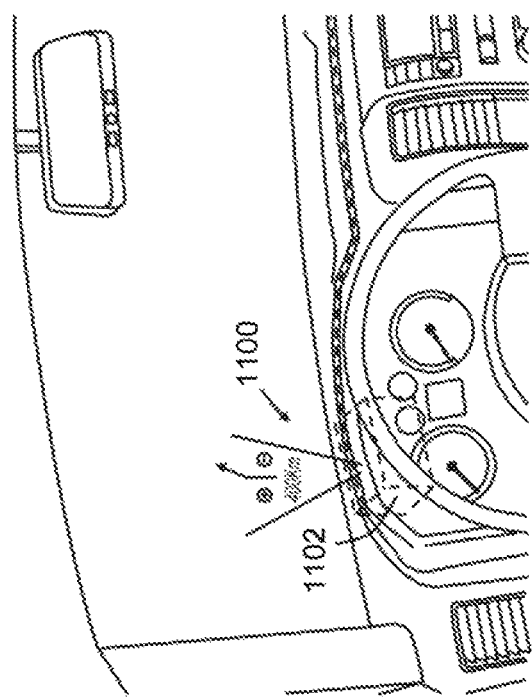
FIG. 11 shows a perspective view of a head-up display system in accordance with various embodiments of the present invention.

Turning to FIG. 11, a perspective view of a head-up display system 1100 in accordance with various embodiments is illustrated. Specifically, head-up display system 1100 is an example of the type of device in which a scanning laser projector as described above can be implemented (e.g., scanning laser projector 100, scanning laser projector 700). The head-up display system 1100 includes a scanning laser projector 1102. Specifically, the scanning laser projector 1102 is shown mounted in a vehicle dash to project the head-up display. Although an automotive head-up display is shown in FIG. 11, this is not a limitation and other applications are possible. For example, various embodiments include head-up displays in avionics application, air traffic control applications, and other applications.

Figure 12:
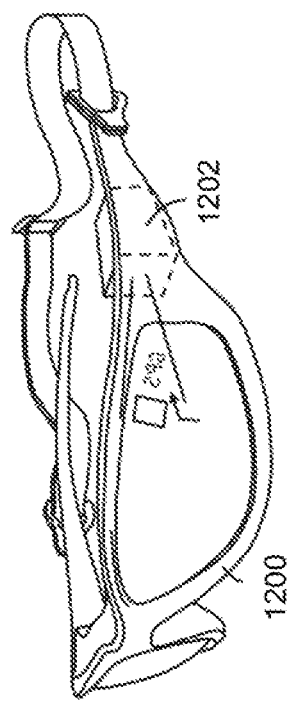
FIG. 12 shows a perspective view of eyewear in accordance with various embodiments of the present invention.

Turning to FIG. 12, a perspective view of eyewear 1200 in accordance with various embodiments is illustrated. Specifically, eyewear 1200 is an example of the type of device in which a scanning laser projector as described above can be implemented (e.g., scanning laser projector 100, scanning laser projector 700). Eyewear 1200 includes scanning laser projector 1202 to project a display in the eyewear's field of view. In some embodiments, eyewear 1200 is see-through and in other embodiments, eyewear 1200 is opaque. For example, eyewear 1200 may be used in an augmented reality application in which a wearer can see the display from projector 1202 overlaid on the physical world. Also for example, eyewear 1200 may be used in a virtual reality application, in which a wearer's entire view is generated by projector 1202.

Although only one projector 1202 is shown in FIG. 12, this is not a limitation and other implementations are possible. For example, in some embodiments, eyewear 1200 includes two projectors 1202, with one for each eye Turning to FIG. 13, a perspective view of a gaming apparatus 1300 in accordance with various embodiments is illustrated. Gaming apparatus 1300 allows a user or users to observe and interact with a gaming environment. In some embodiments, the game is navigated based on the motion, position, or orientation of gaming apparatus 1300, an apparatus that includes scanning laser projector 1302. Other control interfaces, such as manually-operated buttons, foot pedals, or verbal commands, may also contribute to navigation around, or interaction with the gaming environment. For example, in some embodiments, trigger 1342 contributes to the illusion that the user or users are in a first person perspective video game environment, commonly known as a "first person shooter game." Because the size and brightness of the projected display can be controlled by the gaming application in combination with the user's movement, gaming apparatus 1300 creates a highly believable or "immersive" environment for these users.

Many other first person perspective simulations can also be created by gaming apparatus 1300, for such activities as 3D seismic geo-prospecting, spacewalk planning, jungle canopy exploration, automobile safety instruction, medical education, etc. Tactile interface 1344 may provide a variety of output signals, such as recoil, vibration, shake, rumble, etc. Tactile interface 1344 may also include a touch-sensitive input feature, such as a touch sensitive display screen or a display screen that requires a stylus. Additional tactile interfaces, for example, input and/or output features for a motion sensitive probe are also included in various embodiments of the present invention.

Gaming apparatus 1300 may also include audio output devices, such as integrated audio speakers, remote speakers, or headphones. These sorts of audio output devices may be connected to gaming apparatus 1300 with wires or through a wireless technology. For example, wireless headphones 1346 provide the user with sound effects via a BLUETOOTH™ connection, although any sort of similar wireless technology could be substituted freely. In some embodiments, wireless headphones 1346 may include microphone 1345 or binaural microphone 1347, to allow multiple users, instructors, or observers to communicate. Binaural microphone 1347 typically includes microphones on each ear piece, to capture sounds modified by the user's head shadow. This feature may be used for binaural hearing and sound localization by other simulation participants.

Gaming apparatus 1300 may include any number of sensors 1310 that measure ambient brightness, motion, position, orientation, and the like. For example, gaming apparatus 1300 may detect absolute heading with a digital compass, and detect relative motion with an x-y-z gyroscope or accelerometer. In some embodiments, gaming apparatus 1300 also includes a second accelerometer or gyroscope to detect the relative orientation of the device, or its rapid acceleration or deceleration. In other embodiments, gaming apparatus 1300 may include a Global Positioning Satellite (GPS) sensor, to detect absolute position as the user travels in terrestrial space.

Gaming apparatus 1300 may include battery 1341 and/or diagnostic lights 1343. For example, battery 1341 may be a rechargeable battery, and diagnostic lights 1343 could indicate the current charge of the battery. In another example, battery 1341 may be a removable battery clip, and gaming apparatus 1300 may have an additional battery, electrical capacitor or super-capacitor to allow for continued operation of the apparatus while the discharged battery is replaced with a charged battery. In other embodiments, diagnostic lights 1343 can inform the user or a service technician about the status of the electronic components included within or connected to this device. For example, diagnostic lights 1343 may indicate the strength of a received wireless signal, or the presence or absence of a memory card.

Diagnostic lights 1343 could also be replaced by any small screen, such as an organic light emitting diode or liquid crystal display screen. Such lights or screens could be on the exterior surface of gaming apparatus 1300, or below the surface, if the shell for this apparatus is translucent or transparent. Other components of gaming apparatus 1300 may be removable, detachable or separable from this device. For example, scanning laser projector 1302 may be detachable or separable from gaming housing 1389. In some embodiments, the subcomponents of scanning laser projector 100 may be detachable or separable from gaming housing 1389, and still function.

Figure 14:
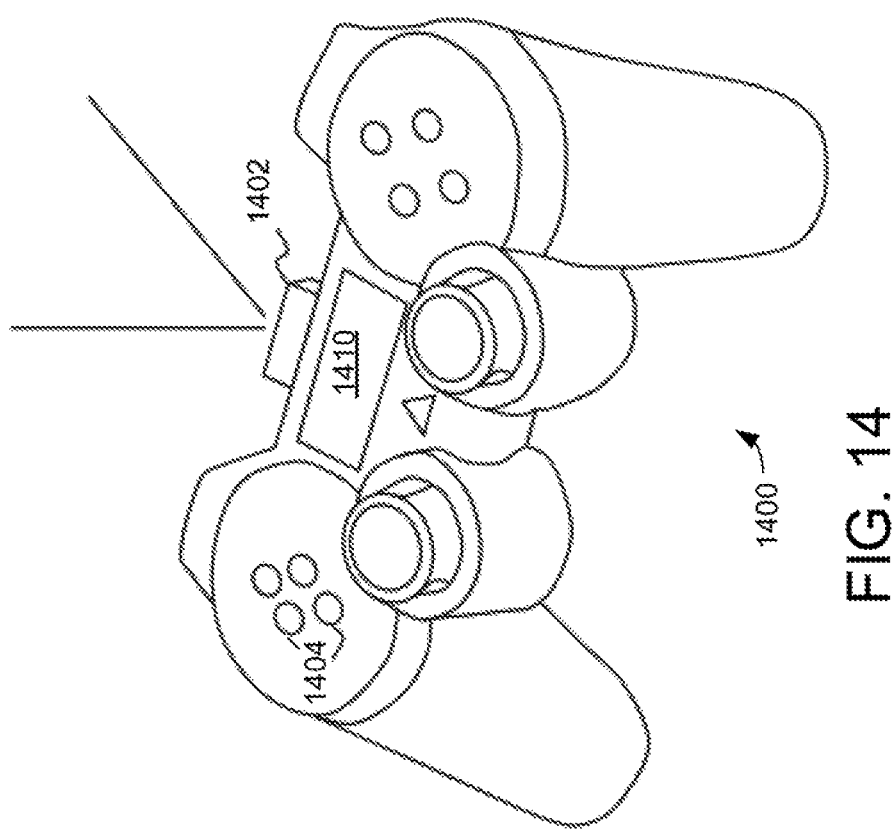
FIG. 14 shows a perspective view of a gaming apparatus in accordance with various embodiments of the present invention.

Turning to FIG. 14, a perspective view of a gaming apparatus 1400 in accordance with various embodiments is illustrated. Gaming apparatus 1400 includes buttons 1404, display 1410, and projector 1402. In some embodiments, gaming apparatus 1400 is a standalone apparatus that does not need a larger console for a user to play a game. For example, a user may play a game while watching display 1410 and/or the projected content. In other embodiments, gaming apparatus 1400 operates as a controller for a larger gaming console. In these embodiments, a user may watch a larger screen tethered to the console in combination with watching display 1410 and/or projected content.

In one embodiment, a scanning projector is provided, the scanning projector comprising a multi-stripe laser, the multi-stripe laser including at least a first laser element and second laser element formed together on a semiconductor die, the first laser element configured to output a first laser light beam and the second laser element configured to output a second laser light beam; at least one scanning mirror configured to reflect the first laser beam and the second laser light beam; and a drive circuit configured to provide an excitation signal to excite motion of the at least one scanning mirror to reflect the first laser beam and the second laser light beam in a raster pattern of scan lines.

In another embodiment, a scanning laser projector is provided, comprising: a multi-stripe laser including at least a first laser element and second laser element formed together on a semiconductor die, the first laser element configured to output a first laser light beam and the second laser element configured to output a second laser light beam; at least one scanning mirror configured to reflect the first laser light beam and the second laser light beam; a drive circuit configured to provide an excitation signal to excite motion of the at least one scanning mirror to reflect the first laser beam and the second laser light beam in a raster pattern of scan lines such that the reflected first laser light beam and the reflected second laser light beam simultaneously correspond to different rows of pixels in a projected image; and a pixel drive generator, and wherein the pixel drive generator is configured to independently control the first laser element and the second laser element to modulate the first laser light beam and the second laser light beam to simultaneously generate different pixels in the different rows of the projected image.

In another embodiment, a scanning laser projector is provided, comprising: a multi-stripe laser including at least a first laser element and second laser element formed together on a semiconductor die, the first laser element configured to output a first laser light beam and the second laser element configured to output a second laser light beam; at least one scanning mirror configured to reflect the first laser light beam and the second laser light beam; a drive circuit configured to provide an excitation signal to excite motion of the at least one scanning mirror to reflect the first laser beam and the second laser light beam in a raster pattern of scan lines such that the reflected first laser light beam and the reflected second laser light beam simultaneously correspond to different pixels in a same row of a projected image; and a pixel drive generator, and wherein the pixel drive generator is configured to independently control the first laser element and the second laser element to modulate the first laser light beam and the second laser light beam to simultaneously generate the different pixels in the same row of the projected image.

In another embodiment, a scanning laser projector is provided, comprising: a multi-stripe laser including at least a first laser element, second laser element, and a third laser element formed together on a semiconductor die, the first laser element configured to output a first laser light beam of a first color, the second laser element configured to output a second laser light beam of a second color different from the first color, and the third laser element configured to output a third laser light beam of a third color different from the first color and the second color; at least one scanning mirror configured to reflect the first laser light beam, the second laser light beam, and the third laser light beam; a drive circuit configured to provide an excitation signal to excite motion of the at least one scanning mirror to reflect the first laser beam and the second laser light beam in a raster pattern of scan lines such that the reflected first laser light beam, the reflected second laser light beam, and the reflected third laser light beam simultaneously correspond to different pixels of a projected image; and a pixel drive generator, and wherein the pixel drive generator is configured to independently control the first laser element, the second laser element, and the third laser element to modulate the first laser light beam, the second laser light beam, and the third laser light beam to simultaneously generate the different pixels in the projected image.

In another embodiment, a method of projecting an image is provided, the method comprising the steps of: simultaneously generating a first laser light beam and a second laser light beam using a multi-stripe laser with at least a first laser element and second laser element formed together on a semiconductor die; exciting motion of at least one scanning mirror to reflect the first laser beam and the second laser light beam in a raster pattern of scan lines; and modulating the first laser light beam and the second laser light beam to simultaneously generate different pixels in the projected image.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. A scanning laser projector, comprising:
    a multi-stripe laser including at least a first laser element and second laser element formed together on a semiconductor die, the first laser element configured to output a first laser light beam and the second laser element configured to output a second laser light beam;
    at least one scanning mirror configured to reflect the first laser beam and the second laser light beam; and
    a drive circuit configured to provide an excitation signal to excite motion of the at least one scanning mirror to reflect the first laser beam and the second laser light beam in a raster pattern of scan lines; and
    wherein the first laser element, the second laser element, and the at least one scanning mirror are configured such that the reflected first laser light beam and the reflected second laser light beam simultaneously correspond to different pixels in a same row of a projected image.

2. The scanning laser projector of claim 1, wherein the at least one scanning mirror is configured to fast scan in a horizontal axis, and wherein the scan in the horizontal axis defines each of a plurality of rows in the raster pattern.

3. The scanning laser projector of claim 1, wherein the first laser element, the second laser element, and the at least one scanning mirror are configured such that the reflected first laser light beam and the reflected second laser light beam each illuminate each pixel in a row such that each pixel in the row is illuminated at least twice.

4. The scanning laser projector of claim 3, wherein the multi-stripe laser is configured such that the first laser light beam and the second laser light beam comprise substantially identical wavelengths such that each pixel in the row is illuminated at least twice with substantially identical wavelengths.

5. The scanning laser projector of claim 1, wherein the multi-stripe laser includes a third laser element formed on the semiconductor die, the third laser element configured to output a third laser light beam, and wherein the at least one scanning mirror is configured to reflect the third laser light beam in the raster pattern such that the reflected first laser light beam, the reflected second laser light beam, and the reflected third laser light beam simultaneously correspond to different pixels in the same row of the projected image.

6. The scanning laser projector of claim 1, wherein the multi-stripe laser is configured such that the first laser light beam and the second laser light beam comprise substantially identical wavelengths.

7. The scanning laser projector of claim 1, wherein the multi-stripe laser is configured such that the first laser light beam and the second laser light beam comprise different wavelengths.

8. The scanning laser projector of claim 1, wherein the multi-stripe laser is configured such that the first laser element and the second laser element are independently controllable.

9. The scanning laser projector of claim 1, further comprising a pixel drive generator, and wherein the pixel drive generator is configured to independently control the first laser element and the second laser element to modulate the first laser light beam and the second laser light beam to simultaneously generate the different pixels in the same row of the projected image.

10. The scanning laser projector of claim 1, wherein the multi-stripe laser includes a third laser element formed on the semiconductor die, the third laser element configured to output a third laser light beam, and wherein the at least one scanning mirror is configured to reflect the third laser light beam in the raster pattern such that the reflected first laser light beam, the reflected second laser light beam, and the reflected third laser light beam simultaneously correspond to different pixels in the same row of the projected image, and further comprising a pixel drive generator, and wherein the pixel drive generator is configured to independently control the first laser element, the second laser element, and the third laser element to modulate the first laser light beam, the second laser light beam, and the third laser light beam to simultaneously generate the different pixels in the same row of the projected image, and wherein the pixel drive generator is configured to individually control the first laser element to selectively not generate the first laser light beam when the first laser light beam would be reflected beyond a vertical perimeter edge of the projected image, and wherein the pixel drive generator is further configured to individually control the second laser element to selectively not generate the second laser light beam when the second laser light beam would be reflected beyond the vertical perimeter edge of the projected image.

11. The scanning laser projector of claim 1, wherein the at least one scanning mirror comprises a first scanning mirror and a second scanning mirror, wherein the first scanning mirror is configured to generate scanning motion of the reflected first laser beam and the reflected second laser light beam in a first axis, and wherein the second scanning mirror is configured to generate scanning motion of the reflected first laser beam and the reflected second laser light beam in a second axis, where the first axis and the second axis are different axes.

12. A scanning laser projector, comprising:
a multi-stripe laser including at least a first laser element and second laser element formed together on a semiconductor die, the first laser element configured to output a first laser light beam and the second laser element configured to output a second laser light beam;
at least one scanning mirror configured to reflect the first laser light beam and the second laser light beam;
a drive circuit configured to provide an excitation signal to excite motion of the at least one scanning mirror to reflect the first laser beam and the second laser light beam in a raster pattern of scan lines such that the reflected first laser light beam and the reflected second laser light beam simultaneously correspond to different rows of pixels in a projected image; and
a pixel drive generator, and wherein the pixel drive generator is configured to independently control the first laser element and the second laser element to modulate the first laser light beam and the second laser light beam to simultaneously generate different pixels in the different rows of the projected image, wherein the pixel drive generator is configured to individually control the first laser element to selectively not generate the first laser light beam when the first laser light beam would be reflected beyond a horizontal perimeter edge of the projected image, and wherein the pixel drive generator is further configured to individually control the second laser element to selectively not generate the second laser light beam when the second laser light beam would be reflected beyond the horizontal perimeter edge of the projected image.

13. A scanning laser projector, comprising:
a multi-stripe laser including at least a first laser element and second laser element formed together on a semiconductor die, the first laser element configured to output a first laser light beam and the second laser element configured to output a second laser light beam;
at least one scanning mirror configured to reflect the first laser light beam and the second laser light beam;
a drive circuit configured to provide an excitation signal to excite motion of the at least one scanning mirror to reflect the first laser beam and the second laser light beam in a raster pattern of scan lines such that the reflected first laser light beam and the reflected second laser light beam simultaneously correspond to different pixels in a same row of a projected image; and
a pixel drive generator, and wherein the pixel drive generator is configured to independently control the first laser element and the second laser element to modulate the first laser light beam and the second laser light beam to simultaneously generate the different pixels in the same row of the projected image.

14. The scanning laser projector of claim 13, wherein the pixel drive generator is configured to individually control the first laser element to selectively not generate the first laser light beam when the first laser light beam would be reflected beyond a vertical perimeter edge of the projected image, and wherein the pixel drive generator is further configured to individually control the second laser element to selectively not generate the second laser light beam when the second laser light beam would be reflected beyond the vertical perimeter edge of the projected image.

15. A method of projecting an image, comprising:
simultaneously generating a first laser light beam and a second laser light beam using a multi-stripe laser with at least a first laser element and second laser element formed together on a semiconductor die;
exciting motion of at least one scanning mirror to reflect the first laser beam and the second laser light beam in a raster pattern of scan lines; and
modulating the first laser light beam and the second laser light beam to simultaneously generate different pixels in a same row of the projected image.

16. The method of claim 15, wherein the at least one scanning mirror is configured to fast scan in a horizontal axis, and wherein the scan in the horizontal axis defines each of a plurality of rows in the raster pattern.

17. The method of claim 15, wherein the first laser element, the second laser element, and the at least one scanning mirror are configured such that the reflected first laser light beam and the reflected second laser light beam each illuminate each pixel in a row such that each pixel in the row is illuminated at least twice.

18. The method of claim 17, wherein the multi-stripe laser is configured such that the first laser light beam and the second laser light beam comprise substantially identical wavelengths such that each pixel in the row is illuminated at least twice with substantially identical wavelengths.

19. The method of claim 15, further comprising simultaneously generating a third laser light beam using the multi-stripe laser with a third laser element formed on the semiconductor die and further comprising modulating the third laser light beam to simultaneously generate a third different pixel in the same row of the projected image.

20. The method of claim 15, wherein the simultaneously generating the first laser light beam and the second laser light beam comprise generating substantially identical wavelengths.

21. The method of claim 15, wherein the simultaneously generating the first laser light beam and the second laser light beam comprise generating substantially different wavelengths.

22. A scanning laser projector, comprising:
a multi-stripe laser including at least a first laser element and second laser element formed together on a semiconductor die, the first laser element configured to output a first laser light beam and the second laser element configured to output a second laser light beam;
at least one scanning mirror configured to reflect the first laser light beam and the second laser light beam;
a drive circuit configured to provide an excitation signal to excite motion of the at least one scanning mirror to reflect the first laser beam and the second laser light beam in a raster pattern of scan lines such that the reflected first laser light beam and the reflected second laser light beam simultaneously correspond to different pixels in a same row of a projected image; and
a pixel drive generator, and wherein the pixel drive generator is configured to independently control the first laser element and the second laser element to modulate the first laser light beam and the second laser light beam to simultaneously generate the different pixels in the projected image, wherein the pixel drive generator is configured to individually control the first laser element to selectively not generate the first laser light beam when the first laser light beam would be reflected beyond a perimeter edge of the projected image, and wherein the pixel drive generator is further configured to individually control the second laser element to selectively not generate the second laser light beam when the second laser light beam would be reflected beyond the perimeter edge of the projected image.

23. The scanning laser projector of claim 22, wherein the different pixels in the projected image comprise different pixels in a same row in the projected image, and wherein the perimeter edge of the projected image comprises a vertical edge of the projected image.

24. The scanning laser projector of claim 22, wherein the different pixels in the projected image comprise different pixels in a same column in the projected image, and wherein the perimeter edge of the projected image comprises a horizontal edge of the projected image.

* * * * *